2,917,508

WATER SOLUBLE 21-N-METHYL-NIPECOTIC ACID ESTERS OF CORTICAL HORMONES

Albert Schlesinger, Jackson Heights, and Samuel M. Gordon, Forest Hills, N.Y., assignors to Endo Laboratories Inc., Richmond Hill, N.Y., a corporation of New York No Drawing. Application February 5, 1958
Serial No. 713,295

13 Claims. (Cl. 260—239.5)

The present invention relates to novel esters of cortisone and its derivatives such as hydrocortisone, prednisolone and prednisone. More particularly it is directed to water soluble 21-N-methyl-nipecotic acid esters of cortisone and its aforesaid derivatives, especially in form of their acid addition salts; and methods of producing same.

Cortisone as well as hydrocortisone, prednisolone and prednisone are nearly insoluble in water. Hence they can be used only in form of emulsions or alcoholic solutions for topical or parenteral applications. As far as water soluble esters of these cortisone derivatives are reported, it can be stated that these compounds are not stable in aqueous solutions at room temperature and even less at higher temperature.

The object of this invention is not only to provide water soluble esters of cortisone and its derivatives, but also new compounds of high stability.

It was entirely unexpected to discover that these new esters of N-methyl-nipecotic acid possess such high stability in aqueous solutions. The solutions are stable against heat and over a long period of storage time. Water solutions of these new ester salts can be autoclaved and used for parenteral or opthalmic application. The pH of an 0.5% solution of these new ester salts is about 4 and therefore especially desirable for topical applications to the skin, where an acid reaction is most desirable.

The products of our invention are prepared by reacting (I) N-methyl nipecotic acid chloride with (II) cortisone, hydrocortisone, prednisolone or prednisone directly with or without inert solvents such as ether, benzene or toluene; or preferably (Ia) the hydrochloride salt of the acid chloride with the cortisone derivatives in presence of anhydrous tertiary amines such as triethylamine, dimethylaniline or pyridine. The molar proportions of I or Ia (based on I) to II are suitably 1 to 3, preferably 1 to 1.5.

The following examples are presented by way of illustration and not for limitation, as obviously certain modifications in the steps of the process and the quantities of the materials employed may be made, without departing from the spirit and scope of the disclosures herein.

EXAMPLE 1

2.5 grams of hydrocortisone are dissolved in 40 cc. of anhydrous pyridine. The solution is cooled to —10° C. and 5 grams of N-methyl nipecotic acid chloride hydrochloride are added with stirring. The reaction mixture is then kept for 2 to 3 days in the ice box. Then 300 cc. of distilled water are added. To the clear solution is then added ammonia solution (28%) until a basic reaction of about pH 9–10 is obtained. By cooling for several hours at ice bath temperature, the basic 21-ester precipitates. It is filtered on a Büchner funnel, washed several times with water, and then dried in a vacuum desiccator, M.P. 145° C.

The basic 21-ester is then transformed into the desired acid addition salt.

The hydrochloride salt was prepared as follows:

2.4 grams of the basic ester were dissolved in 10 cc. of ethanol. To this solution was then added a solution of hydrochloric acid in ethanol until the reaction was acid to Congo red indicator. Ether was then added until the solution started to become turbid. The solution was then cooled in an ice bath and soon crystallization of the hydrochloride salt started. More ether was then added and, after cooling for several hours, the hydrochloride salt was filtered, washed with ether and dried in a vacuum desiccator, $C_{28}H_{41}O_6N.HCl$, M.P. 228° C.

*Analysis*

Calc.: Cl, 6.76%; C, 64.16%; H, 7.88%; N, 2.67%.
Found: Cl, 6.78%; C, 63.57%; H, 7.53%; N, 2.94%.

An 0.5% solution of this hydrocortisone ester hydrochloride salt in distilled water and filled in ampuls could be autoclaved without any decomposition. The same ampuls stored for 8 months at 45° C. were completely stable.

EXAMPLE 2

5 grams of cortisone are dissolved in 70 cc. of anhydrous pyridine and cooled to —10° C. To this solution are added 10 grams of N-methyl nipecotic acid chloride hydrochloride. The reaction mixture is kept for 3 days in the ice box. Then 700 cc. of distilled water are added. To the clear solution is added ammonia solution (28%), until a basic reaction of about 9–10 is obtained. By cooling for several hours at ice bath temperature, the basic 21-ester precipitates. Filtered, washed with water and dried in a desiccator it has a melting point of 186° C.

This basic 21-ester is then dissolved in 70 cc. of ethanol, and a solution of HCl in ethanol added until the reaction is acid to Congo red. Then about 200 cc. of ether were added and cooled in an ice bath. The crystallized hydrochloride salt is then filtered, washed with ether and dried in a desiccator, M.P. 223° C.

*Analysis*

$C_{28}H_{39}O_6N.HCl$—Calc.: Cl, 6.79%. Found: Cl, 7.2%.

EXAMPLE 3

4 grams of prednisone are dissolved in 60 cc. of anhydrous pyridine and cooled to —10° C. There are then added 7 grams of N-methyl nipecotic acid chloride hydrochloride and the mixture kept for 3 days in the ice box. Then 600 cc. of distilled water are added and to the clear solution ammonia (28%) is added till a basic reaction of about 9–10 is obtained. The precipitated basic 21-ester is filtered, washed with water and dried in a desiccator, M.P. 158° C. The hydrochloride salt was prepared as in Example 2 and crystallized from ethanol and ether, M.P. 217° C.

*Analysis*

$C_{28}H_{37}O_6N.HCl$—Calc.: Cl, 6.82%. Found: Cl, 7.2%.

EXAMPLE 4

3.4 grams of prednisolone are dissolved in 50 cc. of anhydrous pyridine and cooled to —10° C. To this solution are added 6 grams of N-methyl nipecotic acid chloride hydrochloride. The reaction mixture is kept for 3 days in the ice box. Then 500 cc. of distilled water are added. To the clear solution is added ammonia solution (28%) until a basic reaction of about pH 9–10 is obtained. By cooling for several hours at ice bath temperature, the basic 21-ester precipitates. The base is filtered, washed with water and dried in a desiccator, M.P. 185° C.

The basic 21-ester is then dissolved in 20 cc. of ethanol and a solution of HCl in ethanol added till Congo acid reaction. The hydrochloride salt precipitates after adding ether and cooling at ice bath temperature, M.P. 235° C.

*Analysis*

$C_{28}H_{39}O_6N \cdot HCl$—Calc.: Cl, 6.79%. Found: Cl., 7.2%.

We claim:

1. Members of the group consisting of the 21-N-methyl nipecotic acid esters of the group consisting of cortisone, hydrocortisone, prednisone and prednisolone, and the pharmaceutically acceptable acid addition salts thereof.
2. The 21-N-methyl nipecotic acid ester of cortisone.
3. The 21-N-methyl nipecotic acid ester of hydrocortisone.
4. The 21-N-methyl nipecotic acid ester of prednisone.
5. The 21-N-methyl nipecotic acid ester of prednisolone.
6. A pharmaceutically accepted acid addition salt of the compound of claim 2.
7. A pharmaceutically accepted acid addition salt of the compound of claim 3.
8. A pharmaceutically accepted acid addition salt of the compound of claim 4.
9. A pharmaceutically acceptable acid addition salt of the compound of claim 5.
10. The hydrochloride of the compound of claim 2.
11. The hydrochloride of the compound of claim 3.
12. The hydrochloride of the compound of claim 4.
13. The hydrochloride of the compound of claim 5.

References Cited in the file of this patent

UNITED STATES PATENTS

| | | |
|---|---|---|
| 2,751,402 | Schneider | June 19, 1956 |
| 2,813,108 | Hanze | Nov. 12, 1957 |
| 2,813,111 | Hogg et al. | Nov. 12, 1957 |